(12) United States Patent
Mecum et al.

(10) Patent No.: US 11,956,848 B2
(45) Date of Patent: Apr. 9, 2024

(54) METHOD AND SYSTEM FOR DYNAMIC CONNECTED MODE DISCONTINUOUS RECEPTION

(71) Applicant: Verizon Patent and Licensing Inc., Basking Ridge, NJ (US)

(72) Inventors: Brian T. Mecum, Aliso Viejo, CA (US); Balaji L. Raghavachari, Bridgewater, NJ (US); Garima Garg, Livingston, NJ (US); Taussif Khan, Martinsville, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/326,514

(22) Filed: May 21, 2021

(65) Prior Publication Data

US 2022/0377830 A1 Nov. 24, 2022

(51) Int. Cl.
*H04W 76/28* (2018.01)
*H04W 8/24* (2009.01)
*H04W 48/16* (2009.01)
*H04W 72/51* (2023.01)

(52) U.S. Cl.
CPC ............. *H04W 76/28* (2018.02); *H04W 8/24* (2013.01); *H04W 48/16* (2013.01); *H04W 72/51* (2023.01)

(58) Field of Classification Search
CPC ....... H04W 76/28; H04W 8/24; H04W 48/16; H04W 72/048
See application file for complete search history.

(56) References Cited

U.S. PATENT DOCUMENTS 11,405,911 B2 * 8/2022 Zhang ..................... H04L 5/005
2018/0041983 A1 * 2/2018 Mulaosmanovic .......................... G06Q 10/0833

\* cited by examiner

*Primary Examiner* — Diane D Mizrahi

(57) ABSTRACT

A method, a device, and a non-transitory storage medium are described in which a dynamic C-DRX provisioning service is provided. The service may disable or enable discontinuous reception on a per end device application or network slice basis. The service may invoke an end device capability procedure to modify a discontinuous reception configuration of a network. The service may store information that correlates an application or network slice to a discontinuous reception setting.

20 Claims, 12 Drawing Sheets

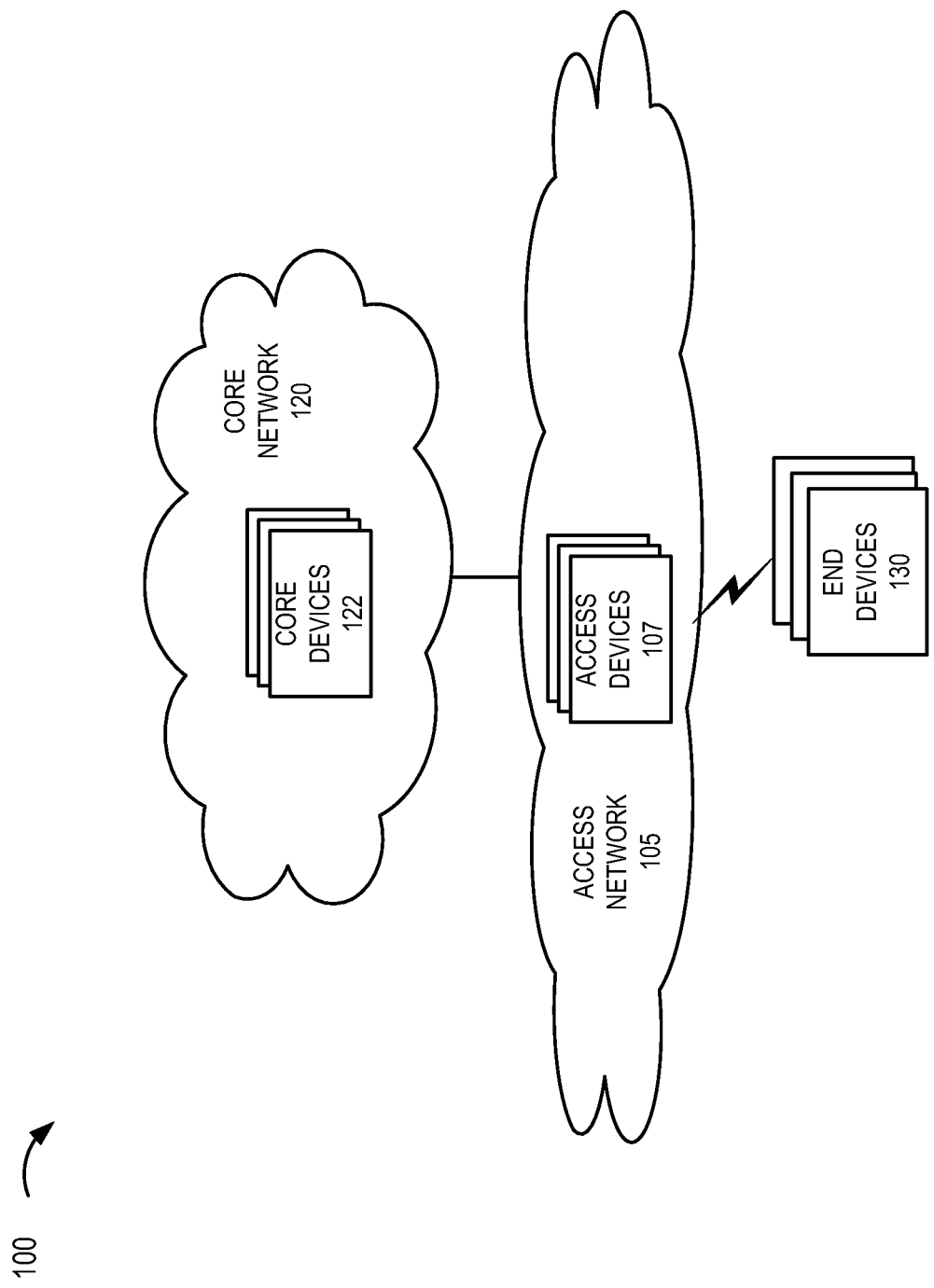

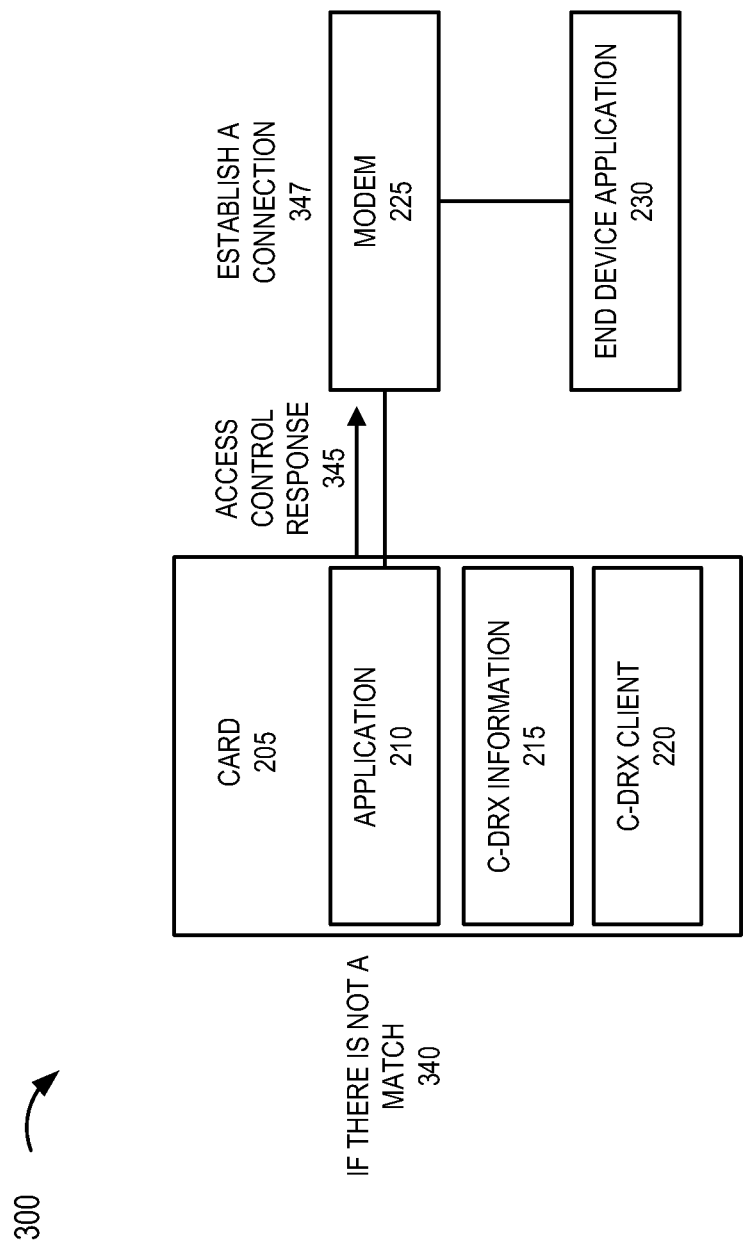

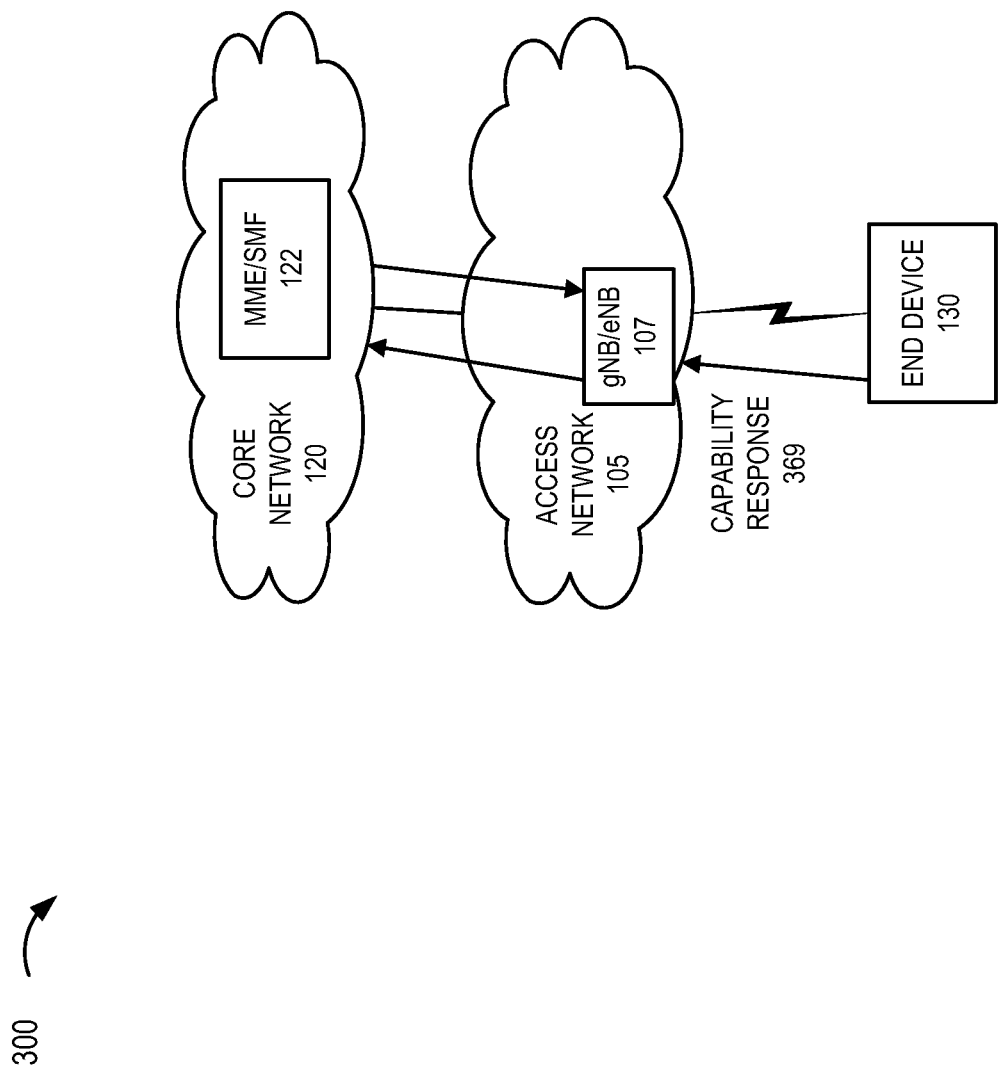

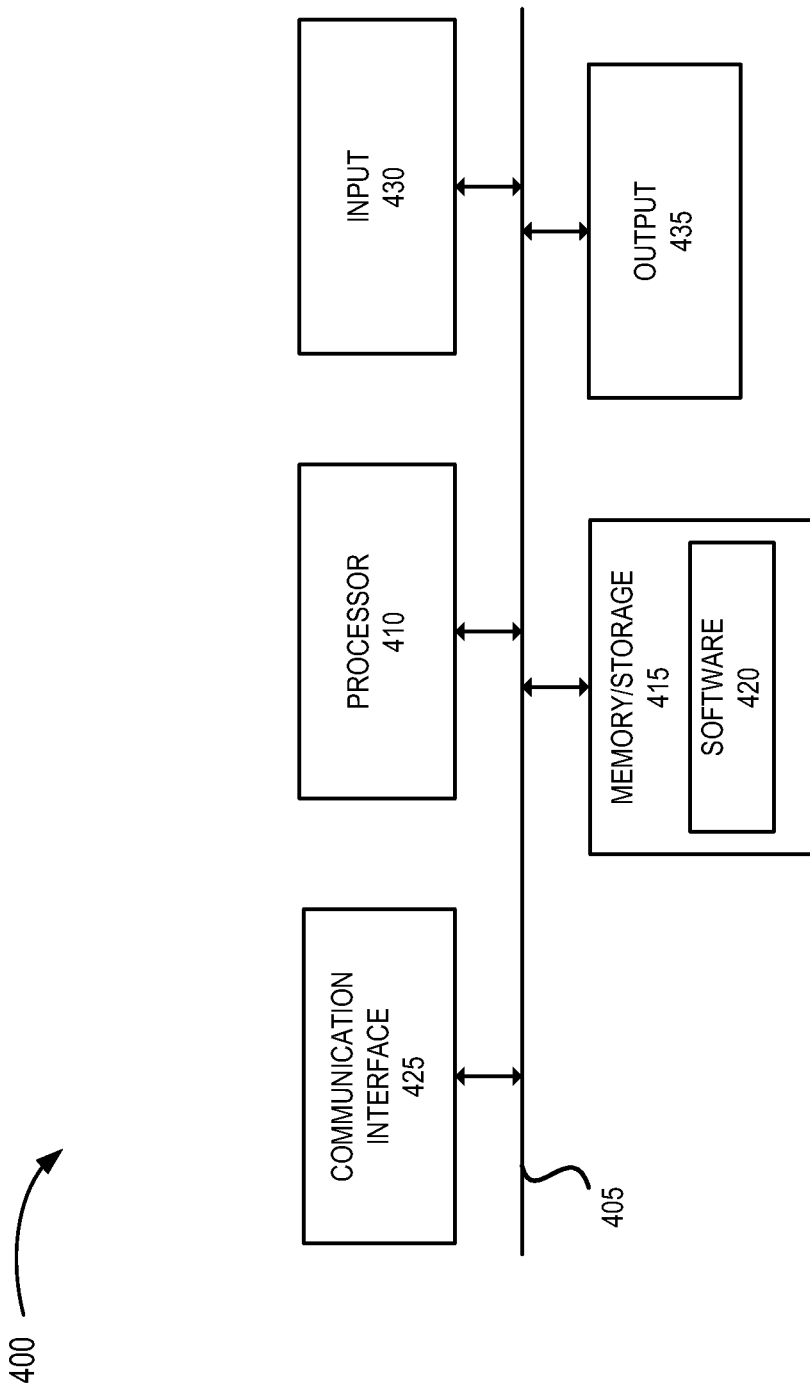

US 11,956,848 B2

METHOD AND SYSTEM FOR DYNAMIC CONNECTED MODE DISCONTINUOUS RECEPTION

BACKGROUND

Discontinuous reception (DRX) is a process of turning on and turning off a radio receiver according to a schedule that is coordinated between a wireless network and a wireless end device. In this way, the wireless device does not need to continuously monitor control channels for messages and can reduce power consumption and extend battery life. A wireless device may operate according to an Idle Mode DRX (I-DRX) and/or a Connected Mode DRX (C-DRX) that pertains to a corresponding Radio Resource Control (RRC) state (e.g., idle, connected, etc.).

BRIEF DESCRIPTION OF THE DRAWINGS

FIG. 1 is a diagram illustrating an exemplary environment in which an exemplary embodiment of a dynamic C-DRX provisioning service may be implemented;

FIGS. 3A-3F are diagrams illustrating an exemplary process of an exemplary embodiment of the dynamic C-DRX provisioning service;

FIG. 4 is a diagram illustrating exemplary components of a device that may correspond to one or more of the devices illustrated and described herein.

DETAILED DESCRIPTION

Figure 2A:
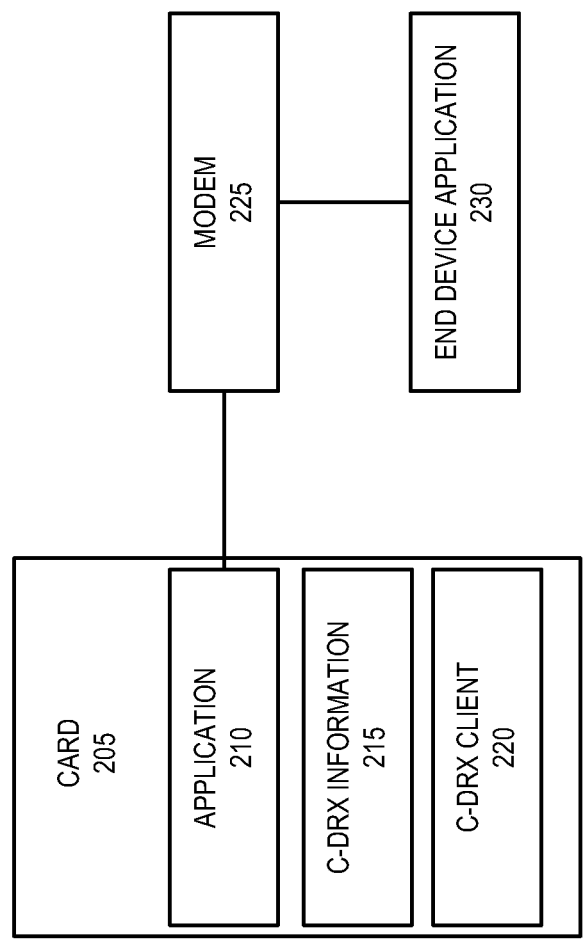
FIG. 2A is a diagram illustrating exemplary components of an end device that provides an exemplary embodiment of the dynamic C-DRX provisioning service.

The following detailed description refers to the accompanying drawings. The same reference numbers in different drawings may identify the same or similar elements. Also, the following detailed description does not limit the invention.

C-DRX may be provisioned in a wireless end device (e.g., user equipment (UE)) to extend battery life and to protect the wireless end device from overheating, for example. According to some standards (e.g., 3GPP, etc.), a per-UE based C-DRX configuration may be provisioned on the wireless end device by a wireless station of a radio access network (RAN), such as a next generation Node B (gNB), an evolved Node B (eNB), or another type of RAN device.

The wireless end device may include one or multiple applications. The application may include various characteristics, such as being active all the time, some of the time, periodically, aperiodically; being associated with minimum performance metrics and values (e.g., throughput, latency, error rate, bitrate, etc.); being associated with a category or type of application (e.g., mission critical, health-related, web browser, voice communication, Internet of Things (IoT), etc.); and/or another type of attribute of the application. In this regard, depending on one or more characteristics of the application, when the application is executing or running, it may be desirable to have the C-DRX disabled on the wireless end device because C-DRX will cause delay to the data transmission and/or reception of the application due to the discontinuous transmission and/or reception and associated time needed for enabling and disabling a transmitter/receiver at the end device. However, the wireless station of the RAN may not be aware of the characteristic of the application and/or is not configured to dynamically change the C-DRX configuration (e.g., OnDuration, DRX Cycle, Inactivity Timer, etc.) when the application is active or executing on a per wireless end device basis. In addition, it is complex for a base station of the RAN to maintain C-DRX state and manage the C-DRX configuration dynamically for each wireless end device service by it in a centralized manner in a mobile or non-mobile environment. In this regard, the performance of the application may be suboptimal. It may be simpler and more straightforward for an end device to initiate any required change of C-DRX based on a need of an application, for example.

According to exemplary embodiments, a dynamic C-DRX provisioning service is described. According to an exemplary embodiment, an end device may include logic that provides the dynamic C-DRX provisioning service, as described herein. For example, the end device may store C-DRX information. The C-DRX information may include information that correlates an identifier of an application to a C-DRX configuration (e.g., enabled or disabled). The logic of the end device may include comparing the current C-DRX configuration of the end device to the C-DRX configuration of the C-DRX information and determine whether they match or not. When the C-DRX configurations do not match, according to an exemplary embodiment, the logic of the end device may initiate a procedure to modify the configuration, as described herein. For example, when the current C-DRX configuration is enabled and the C-DRX information indicates that the C-DRX configuration is to be disabled for the application, the procedure may cause a reconfiguration in which the C-DRX may be set to disabled.

According to an exemplary embodiment, a network device may include logic that provides the dynamic C-DRX provisioning service, as described herein. According to an exemplary embodiment, the dynamic C-DRX provisioning service may perform the procedure to reconfigure a C-DRX setting, as described herein. According to an exemplary embodiment, a network device may provision the C-DRX information onto the end device. For example, the network device may be implemented as an over-the-air (OTA) server or another type of server device.

In view of the foregoing, the dynamic C-DRX provisioning service may dynamically change C-DRX configurations on a per-end device and per-application basis to balance the optimization between battery life and latency and/or another performance metric requirement pertaining to an application of the end device. As a result, the C-DRX of the end device may be configured in a manner that may improve performance of an application of the end device relative to a different C-DRX configuration. Additionally, a device-centric dynamic C-DRX provisioning service may provide an improved versatility for configuring C-DRX on end devices for different device types. For example, not all end devices need to behave in the same manner based on their specific needs of battery optimization and/or another criterion.

FIG. 1 is a diagram illustrating an exemplary environment 100 in which an exemplary embodiment of dynamic C-DRX provisioning service may be implemented. As illustrated, environment 100 includes an access network 105 and a core network 120. Access network 105 includes access devices

107 (also referred to individually or generally as access device 107). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a 5G interface, another generation of interface (e.g., 5.5G interface, a sixth generation (6G) interface, a seventh generation (7G) interface, etc.), or some other type of interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN). Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105 and/or core network 120.

Access network 105 may include different and multiple functional splitting, such as options 1, 2, 3, 4, 5, 6, 7, or 8 that relate to combinations of access network 105 and core network 120 including an evolved packet core (EPC) network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) new radio (NR), stand-alone (SA) NR, etc.).

Depending on the implementation, access network 105 may include one or multiple types of network devices, such as access devices 107. For example, access device 107 may include a gNB, an evolved LTE (eLTE) eNB, an eNB, a radio network controller (RNC), a remote radio head (RRH), a baseband unit (BBU), an RU, a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, 5G and 6G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device. Access device 107 may include a controller device. For example, access device 107 may include a RAN Intelligent Controller (RIC).

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

Core network 120 may include one or multiple networks of one or multiple network types and technologies. Core network 120 may include a complementary network of access network 105. For example, core network 120 may be implemented to include an NGC network, an EPC of an LTE network, an LTE-Advanced (LTE-A) network, and/or an LTE-A Pro network, a future generation core network (e.g., a 5G, a 6G, a 7G, or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End device 130 include a device that may have computational and/or communication capabilities (e.g., wireless). End device 130 may also include wired and/or optical communication capabilities, for example. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of UE). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

End device 130 may store one or multiple end device applications. For example, the end device applications may pertain to a communication application service (e.g., email, text (e.g., Short Messaging Service (SMS), Multimedia Messaging Service (MMS), etc.), voice, conferencing, instant messaging), video streaming, extreme real-time communications (e.g., tactile Internet, augmented reality (AR), virtual reality (VR), etc.), ultra-reliable communication (e.g., automated traffic control and driving, collaborative robots, a health-related service (e.g., monitoring, remote surgery, etc.), drone delivery, public safety, etc.), a web browser for browsing the Web, an IoT application service, and other types of end device applications.

According to an exemplary embodiment, end device 130 includes logic that provides the dynamic C-DRX provisioning service. According to some exemplary embodiments, end device 130 may include a Subscriber Identification Module (SIM) card, an embedded SIM (eSIM), a Universal SIM (USIM), a 5G USIM (or other generation SIM), a Universal Integrated Circuit Card (UICC), an embedded UICC (eUICC), or a similar type of component that may be configured to include logic of the dynamic C-DRX provisioning service (referred to as a "card"). According to other exemplary embodiments, end device 130 may not include a card and provide the dynamic C-DRX provisioning service.

FIG. 2A is a diagram illustrating exemplary components in which an exemplary embodiment of the dynamic C-DRX provisioning service may be implemented. As illustrated, end device 130 may include a card 205. Card 205 may include an application 210, C-DRX information 215, and a C-DRX client 220. End device 130 may also include a modem 225 and an end device application 230. Although not illustrated in FIG. 2, end device 130 may include other components as illustrated and described in relation to FIG. 4. Such components may be apart from or in addition to the exemplary components illustrated and described in FIG. 2.

The arrangement of components and connections between components are exemplary. According to other exemplary embodiments, end device 130 may include additional, different, and/or fewer components, a different arrangement of components, and/or different connections between components than those illustrated and described herein. Additionally, a connection between components may include one or multiple intermediate components that are not illustrated and described. The number and arrangement of connections are exemplary.

Card 205 may be implemented as a SIM, a UICC, a USIM, etc., or a similar type of component, as previously described. According to various exemplary embodiments, although not illustrated, card 205 may include a memory, a processor, a storage, an interface, input/output, and/or another type of hardware component. Card 205 may also include software. The software may include an application, firmware, middleware, microcode, an applet, an application programming interface (API), a module, an operating system (OS), and/or another type of entity. Card 205 may also include a file system (e.g., elementary file, directory, etc.), for example. Card 205 may be removable from end device 130 or permanently installed.

Application 210 may include logic that provides an exemplary embodiment of the dynamic C-DRX provisioning service. For example, application 210 may receive a request from an end device application via modem 225, as described further herein. Application 210 may determine a C-DRX configuration for end device 130 based on the request and C-DRX information 215, as described herein. For example, application 210 may compare a C-DRX configuration associated with the request (and end device application) to a current C-DRX configuration of end device 130.

Figure 2B:
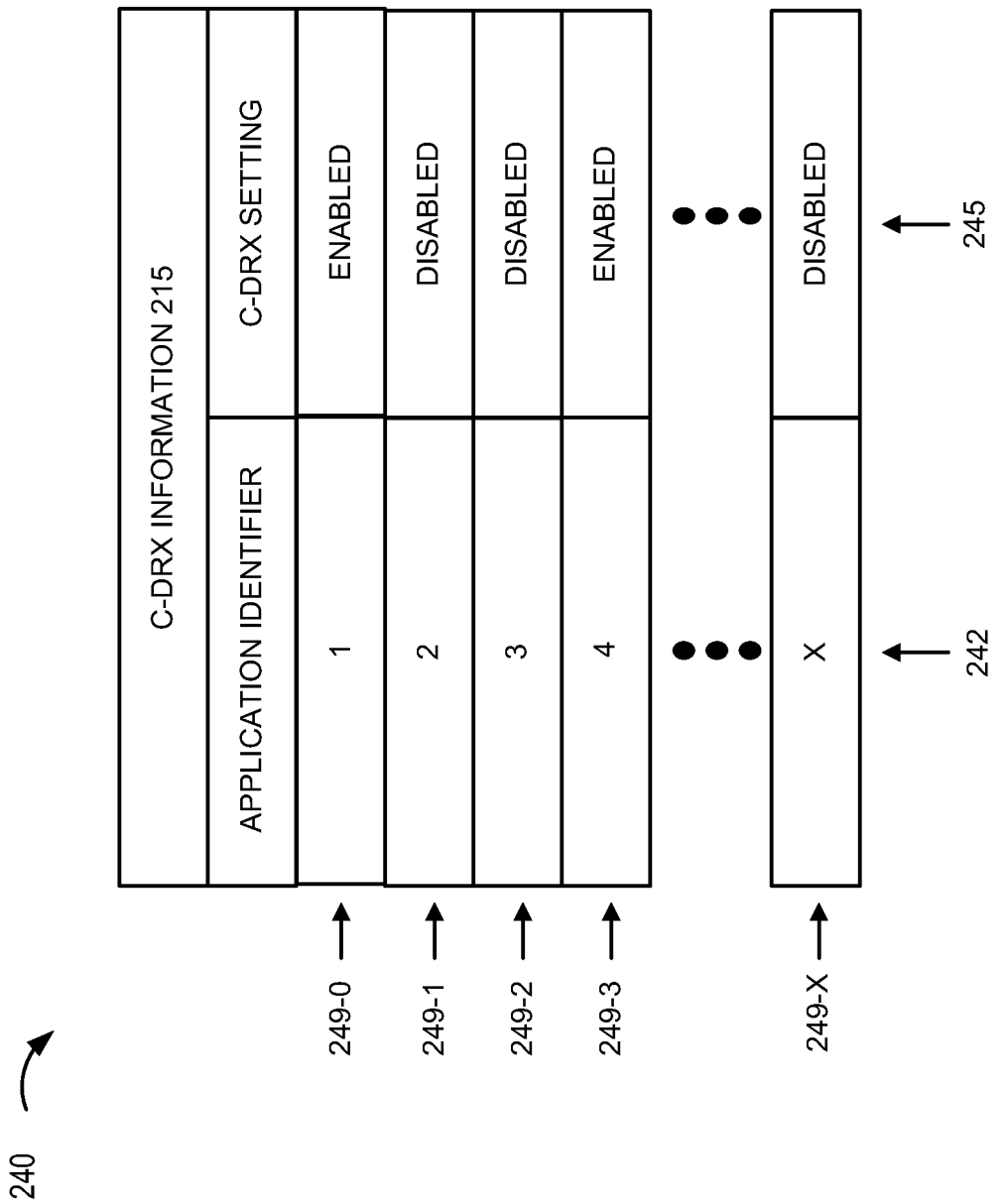
FIG. 2B is a diagram illustrating exemplary C-DRX information according to an exemplary embodiment of the dynamic C-DRX provisioning service.

C-DRX information 215 may include information that correlates an end device application to a C-DRX configuration. FIG. 2B is a diagram that illustrates exemplary C-DRX information 215. For example, referring to a table 240 in FIG. 2B, exemplary C-DRX information 215 is illustrated. Table 240 may include an application identifier field 242 and a C-DRX setting field 245. As further illustrated, table 240 includes entries 249-0 through 249-X (also referred as entries 249, or individually or generally as entry 249) that each includes a grouping of fields 242 and 245 that are correlated (e.g., a record, etc.). The C-DRX information 215 is illustrated in tabular form merely for the sake of description. In this regard, C-DRX information 215 may be implemented in a data structure different from a table (e.g., a list, a flat file, etc.), a database, or another type of structure. Additionally, values illustrated in field 242 and field 245 are exemplary. According to other embodiments, the values, strings, or instances of information stored in a field may be different. The number of entries 249 are exemplary for the sake of description purposes.

Application identifier field 242 may store data that identifies an end device application either directly or indirectly. For example, application identifier field 242 may store an application identifier, such as a string (e.g., numeric, alphabetic, alphanumeric, etc.), an access point name (APN), a Fully Qualified Domain Name (FQDN), a network address, an end device application name, or another suitable indicator of the end device application.

C-DRX setting field 245 may store one or multiple configuration settings for C-DRX. For example, C-DRX setting field 245 may store a setting that indicates whether C-DRX is enabled or disabled, on or off, supported or not supported, modified or not, extended or not, or the like. According to various exemplary embodiments, entries 249 may or may not include entries 249 in which C-DRX setting field 245 indicates "enabled" or "on," for example. For example, for some exemplary embodiments, only end device applications, which may be identified by application identifier field 242, that are desired to have C-DRX setting "disabled" or "off" may be included in the C-DRX information 215.

According to other exemplary embodiments, table 240 may store additional and/or different instances of C-DRX information in support of the dynamic C-DRX provisioning service, as described herein.

Figure 2C:
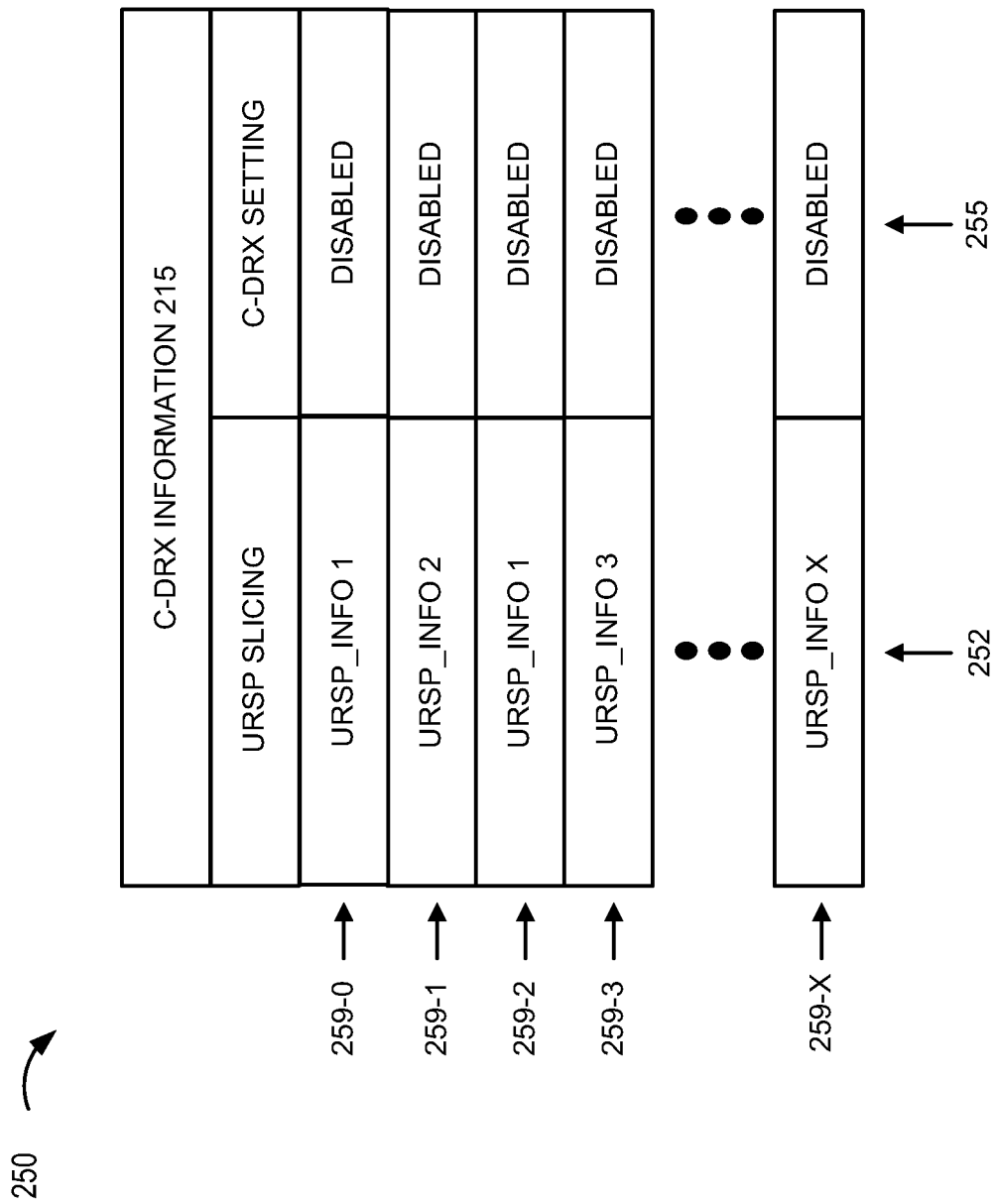
FIG. 2C is a diagram illustrating another example of C-DRX information according to an exemplary embodiment of the dynamic C-DRX provisioning service.

FIG. 2C is a diagram that illustrates another example of C-DRX information 215. For example, referring to a table 250 in FIG. 2C, exemplary C-DRX information 215 is illustrated. Table 250 may include a UE Routing Selection Policy (URSP) slicing field 252 and a C-DRX setting field 255. According to other exemplary embodiments, table 250 may also include an application identifier field, as previously described herein. As further illustrated, table 250 includes entries 259-0 through 259-X (also referred to as entries 259, or individually or generally as entry 259) that each includes a grouping of fields 252 and 255 that are correlated (e.g., a record, etc.). The C-DRX information 215 is illustrated in tabular form merely for the sake of description. In this regard, C-DRX information 215 may be implemented in a data structure different from a table (e.g., a list, a flat file, etc.), a database, or another type of structure. Additionally, values illustrated in field 252 and field 255 are exemplary. According to other embodiments, the values, strings, or instances of information stored in a field may be different.

URSP slicing field 252 may store data pertaining to a network slice. For example, URSP information may include an application identifier, Internet Protocol (IP) descriptors, Single-Network Slice Selection Assistance Information (S-NSSAI), data network name (DNN), Session and Service Continuity (SSC) mode information for an application, network slice mapping, and/or similar types of information. C-DRX setting field 255 may store data similar to that described in relation to field 245 of table 240.

According to other exemplary embodiments, table 250 may store additional and/or different instances of C-DRX information in support of the dynamic C-DRX provisioning service, as described herein.

Referring back to FIG. 2A, C-DRX client 220 may include logic that communicates with a server device in support of the dynamic C-DRX provisioning service. For example, C-DRX client 220 may obtain C-DRX information 215 from an OTA server, a card server that may provision a card (e.g., card 205), an over-the-top (OTT) server, a web server, or another type of server device that may be configured to provision end device 130 or card 205 with C-DRX information, as described herein.

Modem 225 may include logic with computational and communication capabilities. For example, modem 225 may include logic that modulates and demodulates signals. Modem 225 may include logic that encodes and decodes signals. Modem 225 may include an antenna. According to some exemplary embodiments, modem 225 may be implemented as a 4G, a 5G, or another generation modem. Modem 225 may also have a communication link with application 210 and end device application 230, as illustrated in FIG. 2A. As further described herein, modem 225 may receive and transmit messages between these other components.

End device application 230 may include one or multiple end device applications, as described herein. For example, end device application 230 may be a communication application, a video streaming application, an extreme real-time communication application, a web browser, an IoT application, or some other type of end device application. Each end device application 230 may have a set of characteristics, as previously described. For example, the characteristics may pertain to traffic behavior (e.g., continuous, bursty, periodic, aperiodic, amount of data, length of time pertaining to a transmission or a reception of data, etc.), execution behavior (e.g., background application, foreground application, runs intermittently, runs constantly, minimal end device resource usage, extensive end device resource usage, etc.), minimum performance metrics and values (e.g., SLA, QoS, etc.), a category or type of application, and/or another type of attribute.

Figure 3A:
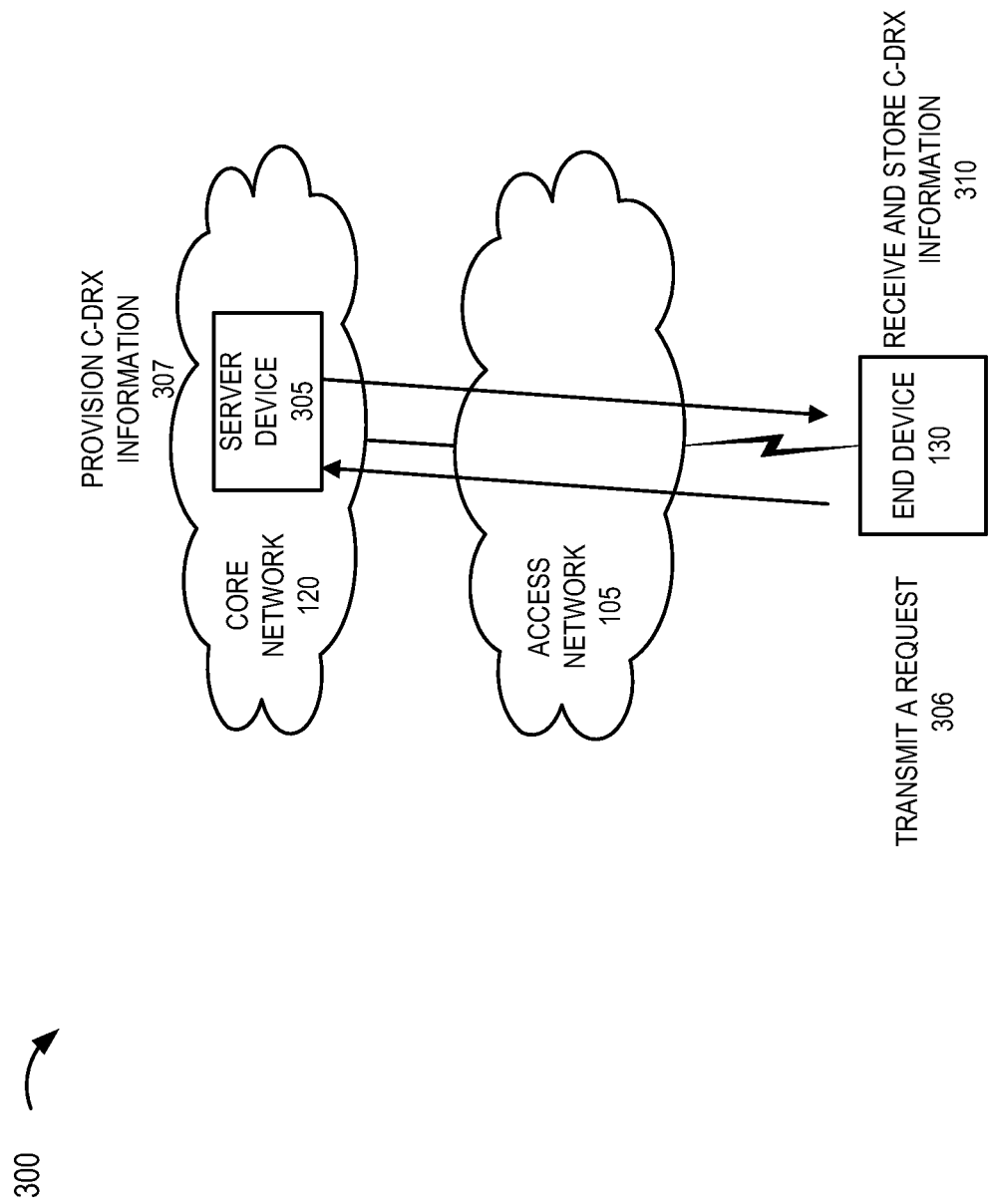

FIGS. 3A-3H are diagrams illustrating an exemplary process 300 of an exemplary embodiment of a dynamic C-DRX provisioning service. Referring to FIG. 3A, end device 130 may be provisioned with C-DRX information. For example, end device 130 and/or card 205 may transmit a request 306 to server device 305. In response to receiving request 306, server device 305 may provision C-DRX information 307. End device 130 and/or card 205 may receive and store the C-DRX information 310. According to some exemplary embodiments, the provisioning may occur during an activation procedure for card 205. According to other exemplary embodiments, the provisioning may occur during an attachment procedure or after attachment. Additionally, or alternatively, the provisioning may occur without request 305 being transmitted (e.g., a push communication). Although server device 305 is illustrated in core network 120, according to other exemplary embodiments, server device 305 may reside elsewhere. After the C-DRX information is provisioning on end device 130 and/or card 205, an exemplary embodiment of the dynamic C-DRX provisioning service may be executed, as described herein. The C-DRX information may be updated after initial provisioning.

Figure 3B:
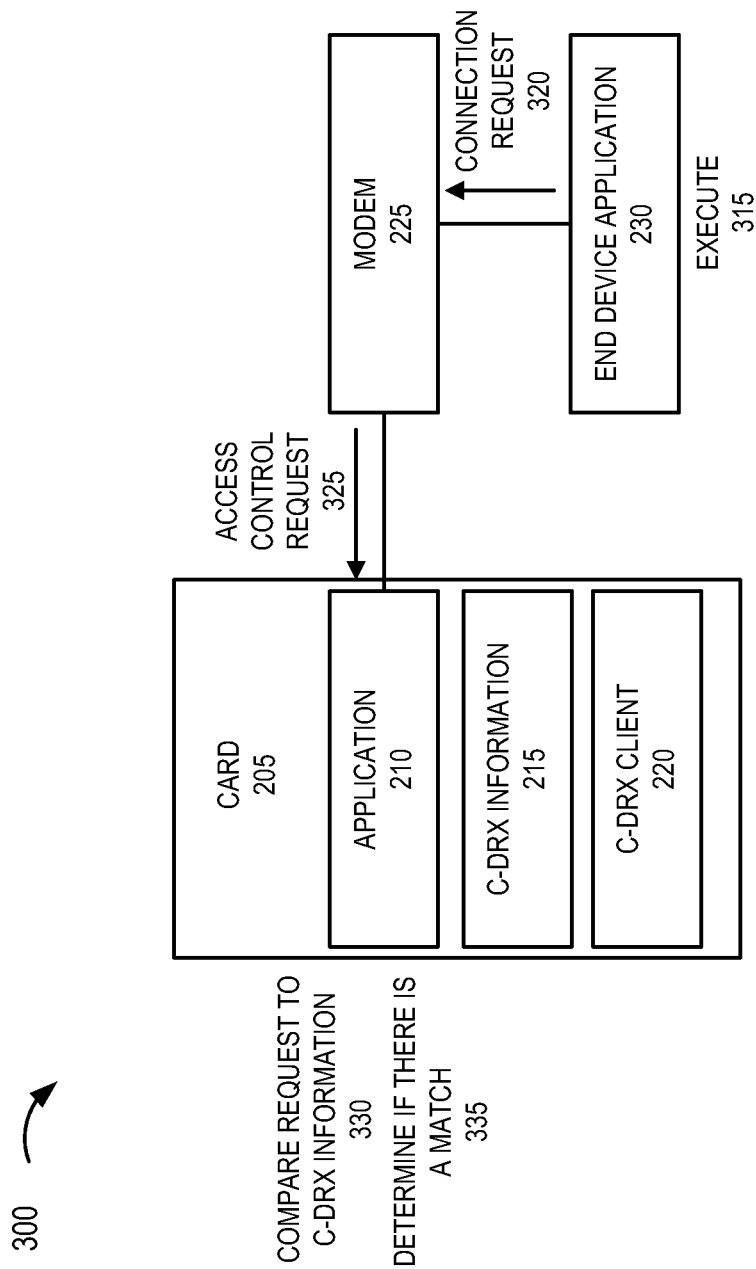

Referring to FIG. 3B, assume during execution 315, end device application 230 wants to establish or use a network connection for an application session (e.g., to transmit packets). End device application 230 may transmit a connection request 320, which is received by modem 225. Modem 225 may pass the request to card 205 as an access control request 325. For example, access control request 325 may be communicated to application 210 of card 205. According to an exemplary embodiment, access control request 325 may include an application identifier that identifies end device application 230. According to another exemplary embodiment, access control request 325 may include a network slice identifier that identifies a network slice to be used by end device application 230 for the application session. According to still other exemplary embodiments, access control request 325 may include additional and/or different information that may be used by application 210 for comparison with C-DRX information 215, as described herein.

As further illustrated, after receiving access control request 325, application 210 may read and/or extract information included in access control request 325 and compare the information to C-DRX information 330. For example, application 210 may use information included in access control request 325 to perform a lookup in relation to C-DRX 215. By way of further example, application 210 may compare an application identifier included access control request 325 to application identifier field 242 or URSP slicing field 252 of FIG. 2B or 2C, as previously explained. Based on a result of the lookup, application 210 may determine if there is a match 335.

Referring to FIG. 3C, if there is no match 340, application 210 may communicate an access control response 345 to modem 225. For example, application 210 may determine, based on the absence of a match, that the C-DRX state of end device 130 does not need to be modified for end device application 230, the application session, and/or end device 130. Access control response 345 may indicate that the connection is approved. In response to receiving access control response 345, modem 225 may establish a connection 347.

Figure 3D:
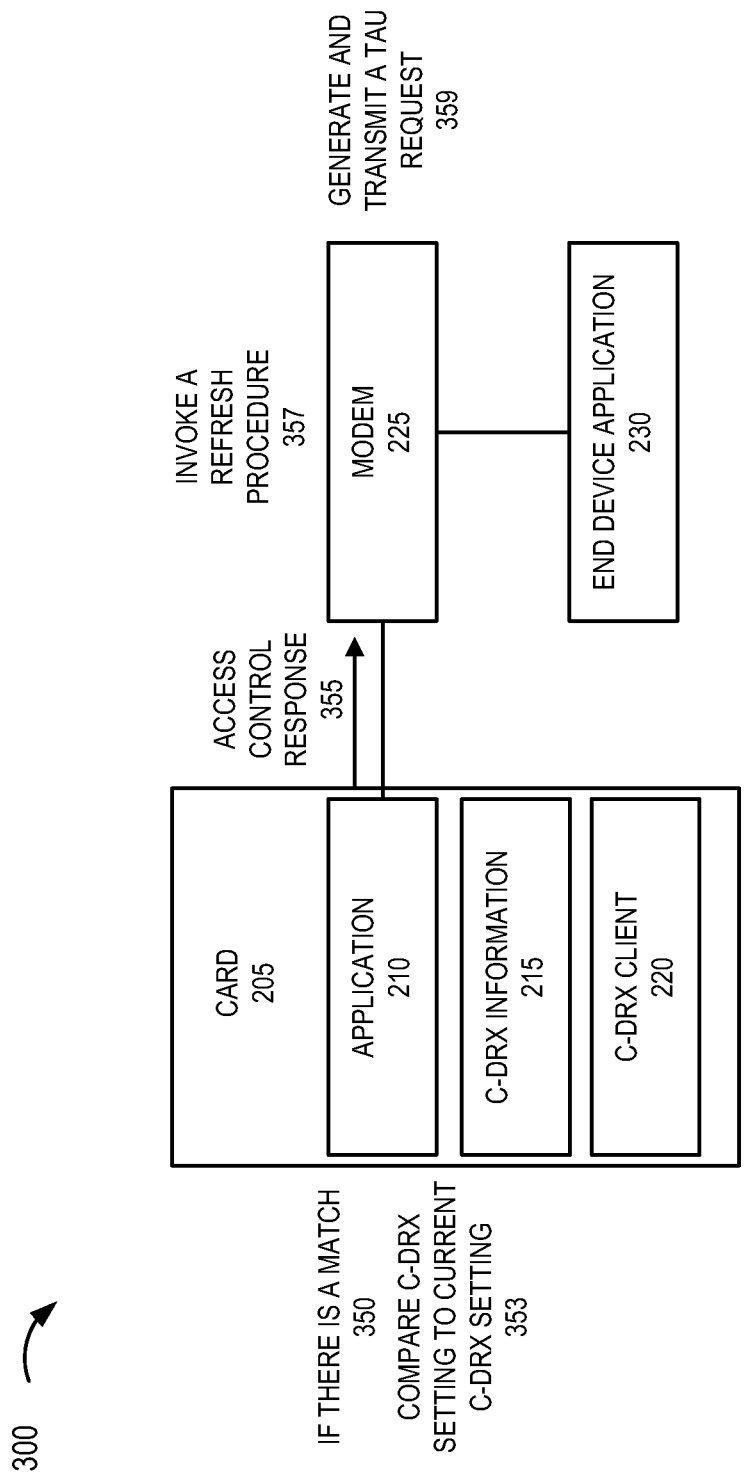

Referring to FIG. 3D, if there is a match 350, application 210 may compare the C-DRX setting included in C-DRX information 215 (e.g., C-DRX setting fields 245 or 255) with the current C-DRX setting 353 of end device 130 (e.g., C-DRX setting associated with modem 225). Based on a result of the comparison, application 210 may determine whether the C-DRX of end device 130 needs to be changed. For example, if the C-DRX setting included in C-DRX information 215 indicates that the C-DRX setting is to be disabled or off and the current C-DRX setting is enabled or on, application 210 may determine to modify the current C-DRX setting. On the other hand, if the C-DRX setting and the current C-DRX setting indicate as disabled or off, application 210 may determine to not modify the current C-DRX setting.

For purposes of description, assume that the C-DRX settings do not match, and application 210 determines to modify the current C-DRX setting. As illustrated, application 210 may communicate an access control response 355 to modem 225. Access control response 355 may indicate that the connection is approved but with a modification. For example, the modification may be to disable the C-DRX of end device 130 and establish a connection for end device application 230. As such, in response to receiving and reading access control response 355, modem 225 may invoke a refresh procedure 357. The refresh procedure may include modem generating and transmitting a tracking area update (TAU) request 359. According to an exemplary implementation, the TAU request may include data indicating that the RRC capability of end device 130 needs to be updated. For example, the data may be implemented as a bit, an information element (IE), a flag, or another suitable data instance. In this way, the refresh procedure may initiate a (new) UE capabilities exchange in which end device 130 may provide capability information indicating that C-DRX is not supported, as described herein. As a consequence, C-DRX may be disabled.

Figure 3E:
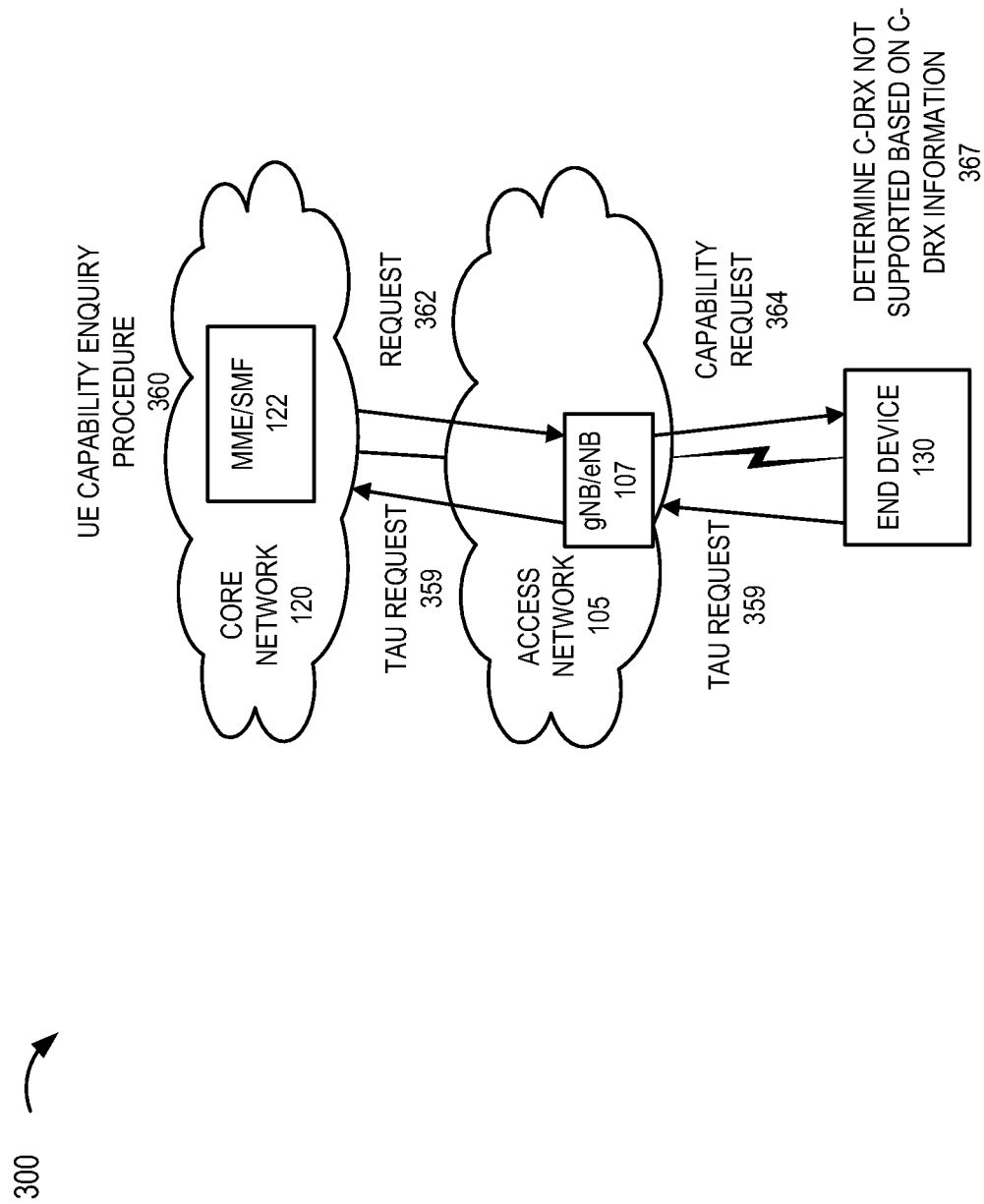

Referring to FIG. 3E, TAU request 359 may be received by a core device 122, such as an MME 122, an SMF 122, or an integrated MME/SMF 122. Based on receiving TAU request 359, which includes the data indicating an RRC capability update request, MME/SMF 122 may initiate a new UE capability enquiry procedure 360. For example, MME/SMF 122 may generate and transmit a request 362 to an access device 107, such as a gNB 107 or an eNB 107, to initiate a UE capability enquiry. Based on receiving request 362, gNB/eNB 107 may generate and transmit a capability request 364 to end device 130. End device 130 may receive request 364 and in response, end device 130 may generate capability information that includes data indicating that C-DRX is not supported. For example, end device 130 may indicate that C-DRX is not supported 367 based on C-DRX information 215. Referring to FIG. 3F, end device 130 may transmit a capability response 369 to gNB/eNB 107. Capability response 369 may include data indicating that C-DRX is not supported. In this way, the network may identify end device 130 as a C-DRX-disabled device. End device 130 may establish a network connection that supports an application session for end device application 230 in which end device 130 is configured as DRX disabled or off, for example.

FIGS. 3A-3F are diagrams illustrating an exemplary process 300, according to other exemplary embodiments, process 300 may include additional, different, or fewer operations. For example, after the application session ends and/or end device application 130 goes into a sleep mode, end device 130 may enable C-DRX according to a similar process. Additionally, for example, when multiple end device applications 230 may request a network connection, application 210 may afford a precedence to an end device application 230 for which C-DRX is to be disabled relative to another end device application 230 for which C-DRX may be enabled.

FIG. 4 is a diagram illustrating exemplary components of a device 400 that may be included in one or more of the devices described herein. For example, device 400 may correspond to access device 107, core device 122, end device 130, MME/SMF 122, gNB/eNB 107, and/or another type of network device, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to application service manager 119, software 420 may include an application that, when executed by processor 410, provides a function and/or a process of dynamic C-DRX provisioning service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application layer network (e.g., external network 115) and/or another type of network (e.g., access network 105, core network 120, etc.). Thus, network devices described herein may be implemented as device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
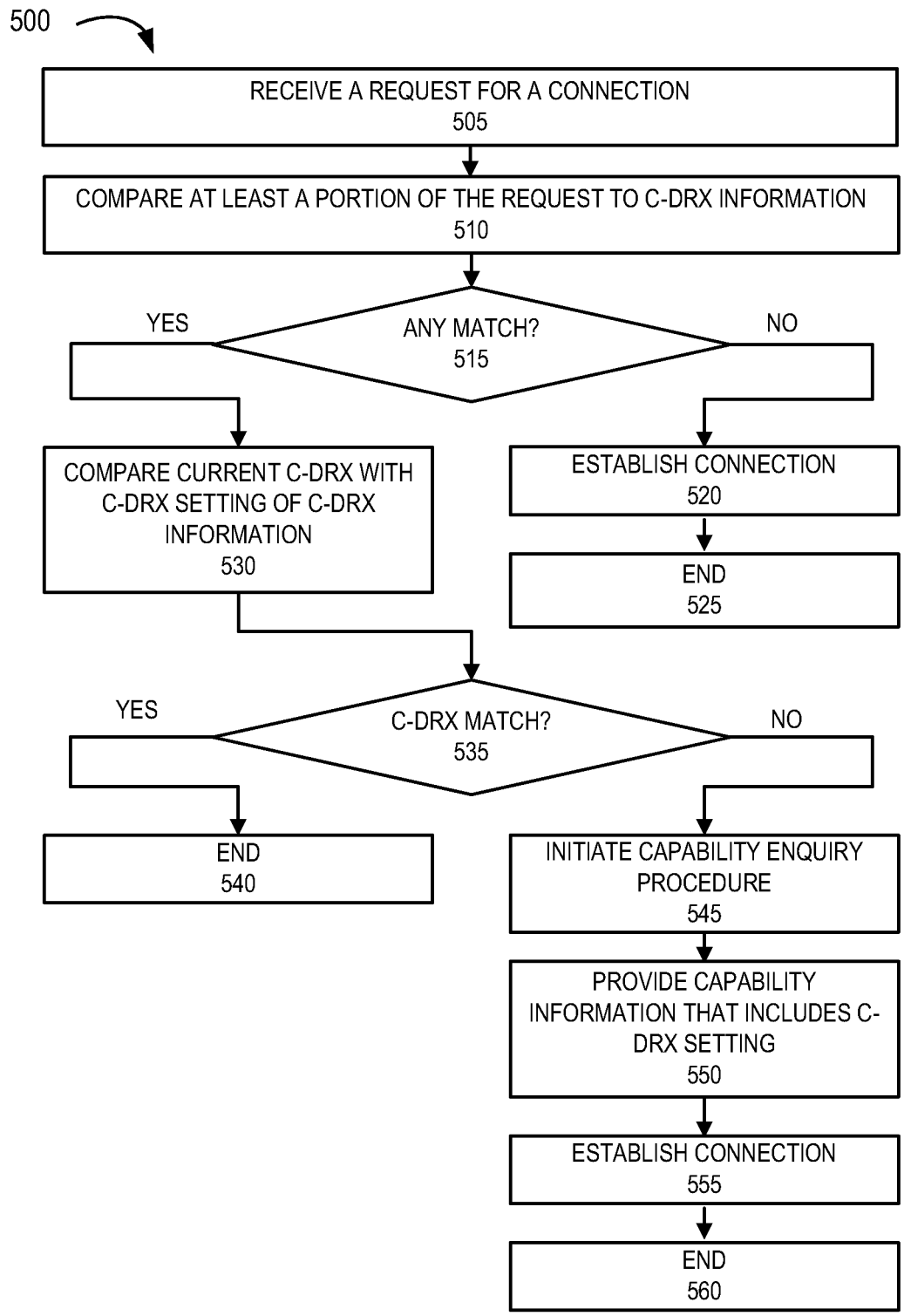
FIG. 5 is a flow diagram illustrating an exemplary process of an exemplary embodiment of a dynamic C-DRX provisioning service.

FIG. 5 is a flow diagram illustrating an exemplary process 500 of an exemplary embodiment of dynamic C-DRX provisioning service. According to an exemplary embodiment, end device 130 may perform a step of process 500. According to an exemplary implementation, processor 410 executes software 420 to perform the step of process 500, as described herein. Alternatively, the step may be performed by execution of only hardware.

In block 505, end device 130 may receive a request for a connection. For example, end device application 230, modem 225, and/or application 210 of card 205 may receive a request for a network connection, as described herein.

In block 510, end device 130 may compare at least a portion of the request to C-DRX information. For example, application 210 may compare information included in the request to C-DRX information 215, as described herein.

In block 515, a determination may be made whether there is a match. For example, based on a lookup procedure, application 210 may determine if there is a match based on the comparison, as described herein.

When it is determined that there is not a match (block 515-NO), end device may establish a connection (block 520). For example, application 210 may communicate approval for the network connection to modem 225. Modem 225 may establish the network connection. Process 500 may end (block 525).

When it is determined that there is a match (block 515—YES), end device 130 may compare the current C-DRX with the C-DRX setting of the C-DRX information (block 530). For example, application 210 may compare the correlated C-DRX setting information with the current C-DRX of end device 130, as described herein. In block 535, end device 130 may determine whether there is a match.

When there is a match (block 535—YES), process 500 may end (block 540). For example, application 210 may communicate approval for the network connection to modem 225. Modem 225 may establish the network connection. When there is not a match (block 535-NO), end device 130 may initiate a capability enquiry procedure (block 545). For example, application 210 may communicate approval with modification for the network connection to modem 225. Modem 225 may transmit a request (e.g., a TAU request) that includes an RRC capability update request, as described herein.

In block 550, end device 130 may provide capability information that includes information indicating whether or not C-DRX is supported on the end device. For example, end device 130 may receive a capability inquiry from a RAN device 107. End device 130 may generate and transmit capability information that indicates C-DRX is not supported based on C-DRX information 215, as described herein. For example, this may be indicated in FeatureGroupindicator IE (4 and 5). In block 555, end device 130 may establish a connection. In block 560, process 500 may end.

FIG. 5 illustrates an exemplary embodiment of a process of dynamic C-DRX provisioning service, according to other exemplary embodiments, the dynamic C-DRX provisioning service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a device, a first request for a network connection pertaining to an application;
determining, by the device based on the first request, that a discontinuous reception (DRX) configuration of the device is to be changed;
transmitting, by the device based on the determining to a network, a second request that includes a radio resource control (RRC) capability update request;
receiving, by the device from the network, a capability enquiry request; and
transmitting, by the device to the network, a response to the capability enquiry request that includes data indicating that DRX is not supported by the device.

2. The method of claim 1, further comprising:
storing, by the device, information that includes a DRX setting correlated to at least one of an application identifier that identifies the application or a network slice identifier that identifies a network slice.

3. The method of claim 2, wherein the determining further comprises:
comparing, by the device, at least a portion of the first request to the information; and
determining, by the device, whether there is a match.

4. The method of claim 1, wherein the second request includes a tracking area update (TAU) request.

5. The method of claim 1, wherein when the device receives the first request for the network connection, the device is DRX enabled.

6. The method of claim 1, wherein the device includes a card that includes a Subscriber Identification Module (SIM) card, an embedded SIM (eSIM), a Universal SIM (USIM), a Universal Integrated Circuit Card (UICC), or an embedded UICC (eUICC), and the card performs the determining.

7. The method of claim 1, further comprising:
establishing, by the device with the network after the transmitting of the response, the network connection that supports an application session of the application, wherein the device is DRX disabled.

8. The method of claim 1, wherein the application is resident on the device.

9. A device comprising:
a processor configured to:
receive a first request for a network connection pertaining to an application;
determine, based on the first request, that a discontinuous reception (DRX) configuration of the device is to be changed;
transmit, to a network based on the determination, a second request that includes a radio resource control (RRC) capability update request;
receive, from the network, a capability enquiry request; and
transmit, to the network, a response to the capability enquiry request that includes data indicating that DRX is not supported by the device.

10. The device of claim 9, wherein the processor is further configured to:
store information that includes a DRX setting correlated to at least one of an application identifier that identifies the application or a network slice identifier that identifies a network slice.

11. The device of claim 10, wherein when determining, the processor is further configured to:
compare at least a portion of the first request to the information; and
determine whether there is a match.

12. The device of claim 9, wherein the second request includes a tracking area update (TAU) request.

13. The device of claim 9, wherein when the device receives the first request for the network connection, the device is DRX enabled.

14. The device of claim 9, wherein the device includes a card that includes a Subscriber Identification Module (SIM) card, an embedded SIM (eSIM), a Universal SIM (USIM), a Universal Integrated Circuit Card (UICC), or an embedded UICC (eUICC), and the card performs the determining.

15. The device of claim 9, wherein the processor is further configured to:
establish with the network, after transmission of the response, the network connection that supports an application session of the application, wherein the device is DRX disabled.

16. The device of claim 9, wherein the application is resident on the device.

17. A non-transitory computer-readable storage medium storing instructions executable by a processor of a device, which when executed cause the processor to:
receive a first request for a network connection pertaining to an application;
determine, based on the first request, that a discontinuous reception (DRX) configuration of the device is to be changed;
transmit, to a network based on the determination, a second request that includes a radio resource control (RRC) capability update request;
receive, from the network, a capability enquiry request; and
transmit, to the network, a response to the capability enquiry request that includes data indicating that DRX is not supported by the device.

18. The non-transitory computer-readable storage medium of claim 17, wherein the instructions comprise further instructions, which when executed, cause the processor to:
   store information that includes a DRX setting correlated to at least one of an application identifier that identifies the application or a network slice identifier that identifies a network slice.

19. The non-transitory computer-readable storage medium of claim 18, wherein the instructions to determine comprise further instructions, which when executed, cause the processor to:
   compare at least a portion of the first request to the information; and
   determine whether there is a match.

20. The non-transitory computer-readable storage medium of claim 17, wherein when the device receives the first request for the network connection, the device is DRX enabled.

* * * * *